Feb. 2, 1926.
O. ALT ET AL
1,571,389
FUEL INJECTING DEVICE FOR INTERNAL COMBUSTION ENGINES
Filed March 27, 1922
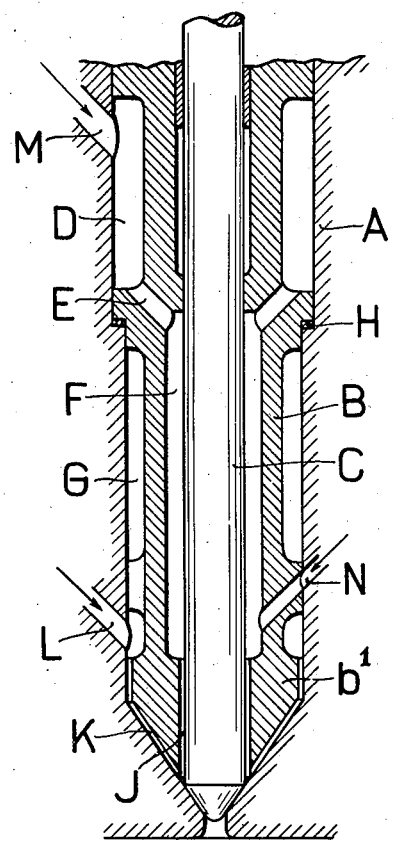

Patented Feb. 2, 1926.

1,571,389

UNITED STATES PATENT OFFICE.

OTTO ALT AND CURT HELSIG, OF KIEL, GERMANY, ASSIGNORS TO FRIED. KRUPP AKTIENGESELLSCHAFT GERMANIAWERFT, OF KIEL-GAARDEN, GERMANY.

FUEL-INJECTING DEVICE FOR INTERNAL-COMBUSTION ENGINES.

Application filed March 27, 1922. Serial No. 547,324.

*To all whom it may concern:*

Be it known that we, OTTO ALT, residing at Kiel, Germany, and CURT HELSIG, residing at Kiel, Germany, both subjects of the Republic of Germany, have invented a certain new and useful Improvement in Fuel-Injecting Devices for Internal-Combustion Engines, of which the following is a specification.

This invention relates to improvements in fuel injecting devices for internal combustion engines, and it has more particularly reference to fuel injecting devices of the type disclosed in United States application Ser. No. 547,323, filed March 27, 1922.

In the fuel injecting devices according to the said application which comprise a needle valve, the working fuel and the compressed injecting air are contained in two concentrical annular rooms which are separated from each other by means of a cylindrical sleeve and which have coinciding outlets. The room for the working fuel is of a size considerably larger than is necessary for the reception of the fuel and it constitutes at the same time an air-chamber which is situated in the interior of the device but tightly separated from the compressed injecting air. The volume of air contained in the said air-chamber assumes the same pressure as the compressed injecting air when the needle valve is closed, while it expands and presses the working fuel into the current of compressed injecting air when the needle valve is opened.

Now, the present invention has for its object to provide a fuel injecting device of the character stated which is designed to be used in connection with engines of the kind in which heavy oils are used during the normal working, while an easily ignitible fuel (ignition oil) is used at the beginning of the working.

With this end in view the invention consists in the arrangement, construction and combination of parts to be herein described and particularly pointed out in the appended claims.

The drawing shows, by way of example, a partial longitudinal section through a fuel injecting device according to the invention; the device shown being similar to that illustrated by Fig. 1 of the said application.

The device comprises a valve cage A in which is mounted a sleeve B receiving the valve needle C. The sleeve B is of a shape such as to form an annular room F between itself and the valve needle C and annular rooms D and G between itself and the wall of the valve cage A. The annular rooms D and F are in connection with each other by bores E. The intermediate portion of the sleeve B is enlarged and forms a shoulder separating the room D from the room G. The wall of the valve cage A has a shoulder corresponding to the shoulder of the sleeve B. A packing ring H mounted between the said two shoulders provides for an airtight joint between the sleeve B and the wall of the valve cage A. The lower end of the sleeve B has the shape of a cone $b^1$ which between itself and the valve needle C leaves an annular passage J which is sub-divided by narrow longitudinal ribs provided on the central bore of the cone $b^1$. A similar annular passage K is left between the cone $b^1$ and the valve cage A. The wall of the valve cage A is provided with a channel L for the admission of working fuel and with a channel M for the admission of the compressed injecting air.

The annular rooms D and F are designed to receive the compressed injecting air, while the annular room G receives the working fuel. The last-mentioned room is larger than is necessary for the reception of the fuel and it constitutes an air-chamber above the fuel.

According to the present invention, there is, besides, provided a supply conduct N for ignition fuel. This conduct extends through the walls of the cage A and of the sleeve B and its outlet is situated in the annular room F for the compressed injecting air.

As regards the working fuel, the operation of the present injecting device is the same as that described in the said application, i. e. the air which is enclosed in the air-chamber of the room G and which, when the valve is closed, possesses the same pressure as the compressed injecting air, rapidly expands when the valve is opened and presses the fuel, at a decreasing velocity, through the annular passage K into the jet of compressed air flowing out from the passage J, the annular passage K acting as an atomizer. The ignition fuel, however, entering the room F by the conduit N, will be carried along by the compressed injecting air which flows out through the passage J at high velocity. The ignition fuel is atomized in the annular passage J and then rushed into the engine cylinder. On account of the different velocities of the compressed injecting air and of the air contained in the said air-chamber, the ignition fuel will enter the engine cylinder before the working fuel, thereby securely instituting the ignition. With this fact, the preliminary condition is fulfilled for an efficient starting of the engine as well as for a perfect working of the engine with heavy oil after the supply of the ignition oil has been cut off.

The arrangement of the annular rooms G and F can also be reversed without any difficulties, which means that the room receiving the working fuel and forming the air-chamber may lie in the interior of the sleeve B, while the room for the compressed injecting air and for the ignition fuel may lie outside the said sleeve.

We claim:

1. In combination with the cylinder of an internal combustion engine, a fuel injecting device in communication therewith, respective chambers in said device for a light auxiliary fuel and a heavy working fuel, a source of injecting air, means whereby on the operation of said device said light fuel is injected into said cylinder under the direct pressure of said injecting air, and means whereby said heavy fuel is injected into said cylinder under the expansive force of an air cushion developed independence upon the pressure of the injecting air.

2. In combination with the cylinder of an internal combustion engine, means for introducing a light auxiliary fuel and a heavy working fuel therein, comprising a valve cage, a valve needle mounted therein, a port in said cylinder controlled by said needle, an air chamber for injecting-air and means for introducing the light fuel therein, a chamber for the heavy fuel, passages connecting said air chamber and said fuel chamber with the cylinder port, means whereby said port being closed an air cushion is formed in said fuel chamber above the fuel, whereby, said port being opened, said light fuel is injected into the cylinder first under the direct action of the injecting air and said heavy fuel is injected into the cylinder under the retarded action of said air cushion.

The foregoing specification signed at Kiel, Germany, this 26th day of January, 1922.

OTTO ALT.
CURT HELSIG.